No. 876,579. PATENTED JAN. 14, 1908.
L. NELSON.
MEAT ROASTING APPARATUS.
APPLICATION FILED FEB. 23, 1906.

WITNESSES:
George L. Humphrey
Beulah Shankland

INVENTOR:
Louise Nelson

UNITED STATES PATENT OFFICE.

LOUISE NELSON, OF OAKLAND, CALIFORNIA.

MEAT-ROASTING APPARATUS.

No. 875,579.　　　Specification of Letters Patent.　　　Patented Jan. 14, 1908.

Application filed February 23, 1906. Serial No. 302,386.

*To all whom it may concern:*

Be it known that I, LOUISE NELSON, a citizen of the United States, and resident of Oakland, in the county of Alameda, State of California, have invented a new and useful Meat-Roasting Apparatus, of which the following is the specification.

My invention relates to certain new and useful improvements in a meat-roasting apparatus having a wire frame which is adjustable to enable it to fit any size of baking pan, commonly used for roasting meats.

The invention consists of the parts and constructions and combinations of parts which I will hereinafter describe and claim.

The essential object of the present invention is to provide a frame or means adapted to support the roast so that it will be maintained out of the gravy, said frame being preferably used in connection with a long fork having sharpened prongs adapted to be thrust through the roast and said fork adapted to be supported on the frame and to rest in grooves or loops formed in said frame.

Figure 1:
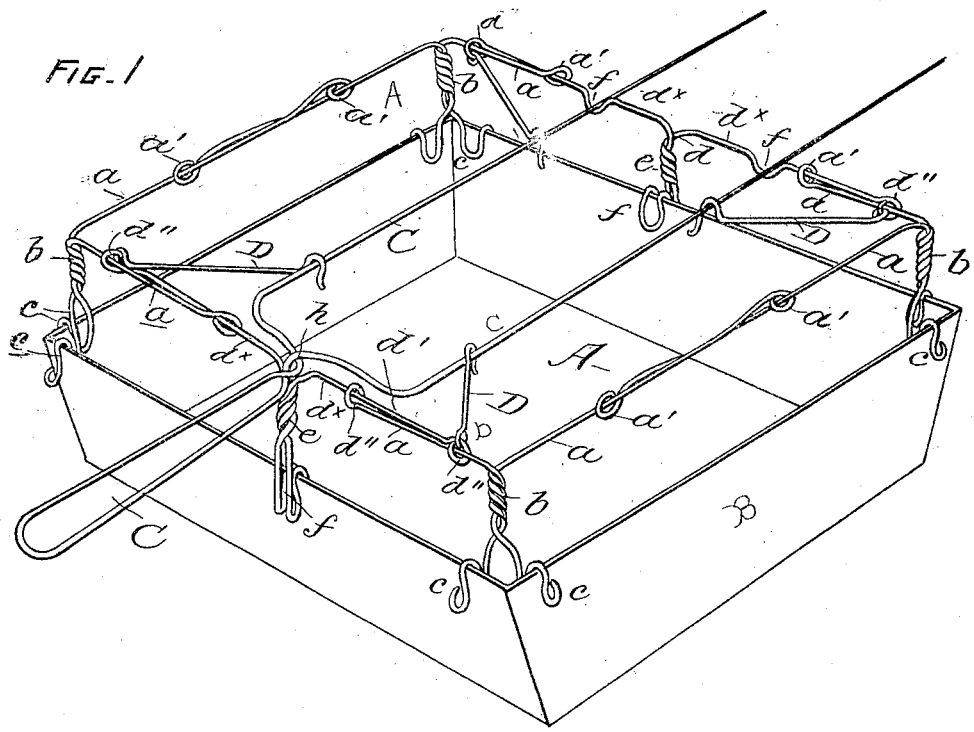
Figure 2:
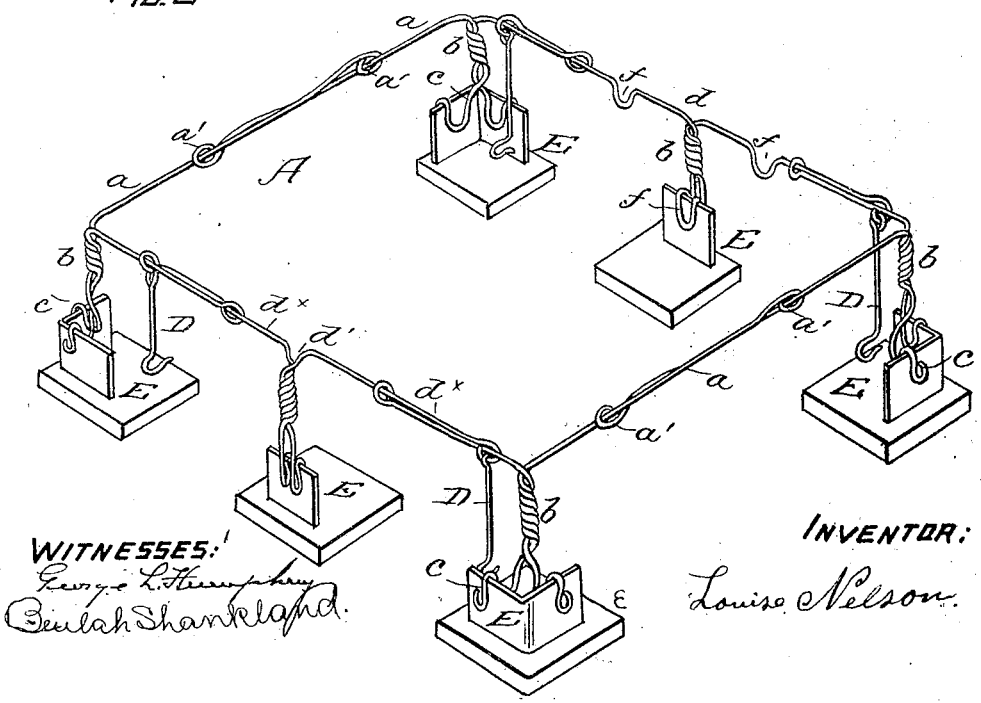

In the accompanying drawings forming part of this specification in which similar letters of reference indicate like parts, Figure 1 is a perspective view of my device applied to an ordinary cooking vessel. Fig. 2 is a perspective view of the same device shown supported by my special form of cast-iron support.

In carrying out my invention I construct the frame, A, of wire formed of pieces or sections so joined that the frame is extensible to increase and decrease its dimensions.

As shown, I employ pairs of sections or pieces $a$ with each piece of a pair having one end formed with a loop or eye $a'$ to receive a corresponding overlapping piece of another pair and thereby form a slidable joint to permit the dimensions of the frame to be varied, and to permit said frame to be used in connection with pans or vessels of different sizes.

The two members $a$ of each pair of pieces are bent to stand at about right angles to each other, and said members are twisted together at $b$, to form a shank, the ends of the pieces being formed with foot-portions, or clips or hook-shaped portions $c$ adapted to fit over and embrace the top edge of the pan or vessel B and thereby support the frame from and directly above the pan so that the drippings from the roast may fall into the pan and the roast may be maintained out of the contents of the pan.

Two of the sides of the frame include in addition to the members $a$, the wire-pieces $d, d'$ each having arms $d^\times$ extending in line in opposite directions and having loops or eyes $d''$ to slidably embrace the contiguous arms of the pieces $a$, said pieces $d^\times$ being twisted together at $e$ and being provided with clips or hook-like portions $f$ to fit over the top edge of the pan as shown in Fig. 1. The wire piece $d$ is also provided with bends $f$ adapted to form seats or rests for the tines of a fork C, said fork also being shown as made of a piece of wire folded at its center and the members of the piece arranged substantially parallel to form a handle and thence twisted together at $h$ and bent in opposite directions and finally again bent to form the tines before mentioned. In practice, the tines of the fork are forced into the roast, the tines resting in the bends $f$ and the handle portion of the fork resting in a seat formed at the upper end of the twisted portion of the wires $d^\times$ of wire $d'$. To assist in holding the fork, I employ hooks D which are loosely connected to the eyes or loops $d''$ of the pieces $d$ $d'$, the hooks engaging the tines of the fork as shown in Fig. 1.

In Fig. 2, I show the frame of Fig. 1 used in connection with iron blocks E, having vertical edges over which the spring clips or hook-shaped portions of the frame are fitted substantially in the manner described for the pan or vessel of Fig. 1. By using the blocks E I am enabled to obtain heat from below without the intervention of the bottom of a pan, and permitting the frame to be adjusted to any sized oven. When the blocks are used, I may also employ a small pan under the frame to catch the drippings.

Having thus described my invention, what I claim as new and desire to secure by Letters Patent, is:—

1. A meat-roasting frame formed of sections of wire with overlapping portions slidably fitted one to the other, said sections comprising pairs of wires with divergent portions and twisted shanks, the lower ends of the shanks being fashioned into hook-form to enable them to fit over the vertical edge of a pan or other support.

2. A meat-roasting frame formed of sections of wire slidably connected, said frame having foot-portions of substantially hook-form adapted to fit over the vertical edge of a support, and a fork extending across said frame and beyond opposite sides thereof, said frame having depressed seats or rests for the members of the fork.

3. A meat roasting frame formed of sections of wire slidably connected, said frame having foot-portions of substantially hook-form adapted to fit over the vertical edge of a support, and a fork extending across said frame and beyond opposite sides thereof, and hooks loosely hung on the frame and adapted to hook into engagement with the fork.

4. A meat roasting device comprising a frame formed of slidably joined sections, said frame having foot-portions of substantially spring-clip form, and metal blocks having vertical edges over which the foot-portions of the frame are detachably fitted.

LOUISE NELSON.

Witnesses:
GEORGE L. HUMPHREY,
BEULAH SHANKLAND.